United States Patent
Shajii et al.

(10) Patent No.: US 7,000,463 B1
(45) Date of Patent: Feb. 21, 2006

(54) REYNOLDS NUMBER CORRECTION FUNCTION FOR MASS FLOW RATE SENSOR

(75) Inventors: Ali Shajii, Canton, MA (US); Paul Meneghini, Haverhill, MA (US)

(73) Assignee: MKS Instruments, Inc., Wilmington, MA (US)

( * ) Notice: Subject to any disclaimer, the term of this patent is extended or adjusted under 35 U.S.C. 154(b) by 0 days.

(21) Appl. No.: 10/987,719

(22) Filed: Nov. 12, 2004

(51) Int. Cl.
*G01F 1/68* (2006.01)
(52) U.S. Cl. .................... 73/202.5; 73/204.21
(58) Field of Classification Search ............ None
See application file for complete search history.

(56) References Cited

U.S. PATENT DOCUMENTS

| | | | | |
|---|---|---|---|---|
| 4,524,616 A | * | 6/1985 | Drexel et al. | 73/203 |
| 4,951,224 A | | 8/1990 | Hokynar | 702/47 |
| 5,861,546 A | * | 1/1999 | Sagi et al. | 73/861.52 |
| 6,332,348 B1 | | 12/2001 | Yelverton et al. | 73/1.34 |

OTHER PUBLICATIONS

*Califlow A-250, Calibration & Service, MKS Technology for Productivity.*
*Molbloc/molbox Gas Flow Standards, DHI Calibration Solutions for Pressure and Flow.*

\* cited by examiner

Primary Examiner—Harshad Patel
(74) Attorney, Agent, or Firm—McDermott Will & Emery LLP (57) ABSTRACT

A mass flow rate sensor uses a Reynolds number correction function to compensate for errors in a bypass ratio of the sensor for all gases, based on the fact that all bypass errors are functions of Reynolds number. The sensor includes a sensor tube and a bypass tube dividing flow, wherein a bypass ratio of the sensor equals a total flow rate through the sensor divided by a flow rate through just the sensor tube. Heater elements heat an upstream portion and a downstream portion of the sensor tube, and a circuit is connected to the heater elements for producing a voltage based upon a difference in resistance between the heater elements. The voltage is calibrated based on known flow rates of a reference gas, and the flow rate through the sensor is based upon the calibrated voltage multiplied by a multi-gas correction function and a Reynolds number correction function.

15 Claims, 6 Drawing Sheets

REYNOLDS NUMBER CORRECTION FUNCTION FOR MASS FLOW RATE SENSOR

FIELD OF THE INVENTION

The present disclosure relates to mass flow rate sensors, and more particularly, to a thermal based mass flow rate sensor incorporating a bypass ratio Reynolds number correction function.

BACKGROUND OF THE DISCLOSURE

In the semiconductor manufacturing industry, it is necessary to achieve precise control of the quantity, temperature and pressure of one or more reactant materials which are delivered in a gaseous state to a reaction chamber. Mass flow controllers (MFC) are widely used in the semiconductor manufacturing industry to control the delivery of process reactants.

A typical MFC generally includes a main conduit including an upstream portion connected to an inlet of the MFC and a downstream portion connected to an outlet of the MFC. The MFC also includes a mass flow rate sensor for measuring the rate of flow of gas through the MFC, a valve for controlling the flow of gas through the MFC and a simple control circuit or a computer mounted on a P.C. board and connected to the mass flow rate sensor and the valve. The computer, or processor, is programmed with a desired flow rate through a connector, for example, which the computer compares to an actual flow rate as measured by the mass flow rate sensor. If the actual flow rate does not equal the desired flow rate, the processor is further programmed to open or close the valve until the actual flow rate equals the desired flow rate.

Thermal mass flow sensors operate on the principle of conservation of thermal energy, where power applied to a flowing gas equals the mass flow rate of the gas multiplied by the specific heat of the gas, the density of the gas and the temperature change of the gas. The mass flow rate can therefore be determined if the properties of the gas, the temperature changes of the gas, and the rate of power applied to the gas are known.

The thermal mass flow rate sensor includes a sensor tube and a bypass tube connecting the upstream portion of the main conduit to the downstream portion of the main conduit such that flow through the main conduit is divided through the sensor tube and the bypass tube. The sensor employs the sensor tube as the primary sensing mechanism. Typically the sensor tube is significantly smaller than the primary conduit. A laminar flow element is normally placed in the bypass tube to provide laminar flow in the bypass tube for a predetermined range of flow.

The thermal mass flow rate sensor also includes one or more heating elements attached to the sensor tube to allow a heat transfer from the heating elements, through the tube and to the gas. The heating elements also serve as resistance temperature sensors that track the local temperature of the wall of the sensor tube. Heat transfer between the gas flowing in the sensor tube from the tube walls is a function of the difference between the gas temperature and the wall temperature, and the heat transfer rate coefficient inside of the tube. The increase in gas temperature between the two heating elements is a function of the mass flow rate of the gas through the sensor tube, the specific heat of the gas, and the power delivered to the heater elements. A circuit converts the difference in resistance (or temperature) of the two elements into a voltage output (power) which is calibrated to known flow rates. Normally, the change in resistance is converted to voltage by a Wheatstone bridge, which is connected to the processor. The processor compares the voltage level to stored reference gas calibration data to determine the flow rate. The stored reference gas calibration data, or table, includes voltages produced by the sensor for a range of known flow rates of the reference gas.

Since the calibration data changes for gases other than the reference gas, a characterization of the calibration data is required for each type of gas being measured in the thermal based mass flow rate sensor, in order for the resulting measurement to be accurate. This characterization is also referred to as multi-gas correction functions. The multi-gas correction function is the ratio of flows, in the sensor tube only, of the new gas over the reference gas (Qnew/Qref). This ratio changes with sensor voltage. The calibration table of the reference gas is simply a list of sensor voltages and measured total flows at those voltages. To obtain the calibration table in the new gas, the flow of the reference gas is multiplied by the multi-gas correction function at each voltage in the reference gas calibration table.

The multi-gas correction function assumes that a bypass ratio is the same in both the reference gas and the gas being measured. The bypass ratio η (also referred to as split ratio) of the sensor is given by the ratio of the total amount of gas flowing through the bypass tube and the sensor tube divided by the amount of gas flowing through the sensor tube only. However, the bypass ratio changes for different gases because of pressure losses (i.e., bypass ratio error), such as entrance effects, caused by non-ideal geometric conditions of the primary conduit, the bypass tube and the sensor tube. These pressure losses are often referred to as "Reynolds Losses" because the losses are a function of the Reynolds number of the gas being measured. The Reynolds Losses can be a major source of error in measuring the gas flow.

One method of compensating for the Reynolds Losses such that the bypass ratio is the same for all gases is to actually calibrate the sensor, including both the sensor tube and the bypass tube, for all gases at know flow rates, and provide another calibration table for each gas. However, this is an expensive and time consuming solution. Another method of compensating for the Reynolds Losses is to limit the sensor to low flow rates so that the multigas correction function reduces to a single coefficient. A further method of compensating for the Reynolds Losses such that the bypass ratio is the same for all gases is to provide the bypass tube, and/or a laminar flow element located within the bypass tube, with a relatively great length such that the entrance effects are made negligible. This method, however, prevents a flow sensor having a compact design.

It is an object of the present disclosure to provide a new and improved thermal mass flow rate sensor which can be used with different gases. Preferably, the new and improved thermal mass flow rate sensor will provide compensation for Reynolds Losses between different gases.

SUMMARY OF THE DISCLOSURE

The present disclosure provides a new and improved thermal mass flow rate sensor. The sensor includes a main conduit including an upstream portion connected to an inlet of the sensor and a downstream portion connected to an outlet of the sensor, and a sensor tube and a bypass tube connecting the upstream portion of the main conduit to the downstream portion of the main conduit such that flow through the main conduit is divided through the sensor tube and the bypass tube, wherein a bypass ratio of the sensor equals a ratio of the total amount of gas flowing through the bypass tube and the sensor tube divided by the amount of gas flowing through the sensor tube only.

The sensor also includes heater elements for heating an upstream portion and a downstream portion of the sensor tube and a sensor circuit connected to the heater elements for producing a voltage based upon a difference in resistance between the heater elements. The voltage is calibrated based on known flow rates of a reference gas through the sensor. A processor or control circuit is connected to the sensor circuit and is programmed to measure the flow rate through the sensor based upon the calibrated voltage from the circuit. The processor is also programmed to multiply the flow rate of the reference gas by a multi-gas correction function in order to compensate for calibration data changes between the reference gas and the gas being measured, and multiply the flow rate of the reference gas by a Reynolds number correction function to compensate for differences between the bypass ratios of the reference gas and the gas being measured.

Among other features and benefits, the mass flow rate sensor of the present disclosure provides compensation for the Reynolds Losses of different gases.

BRIEF DESCRIPTION OF THE DRAWINGS

The foregoing and other objects of this disclosure, the various features thereof, as well as the disclosure itself, may be more fully understood from the following description, when read together with the accompanying drawings in which.

Elements having the same reference character designations represent like elements throughout the drawings.

DETAILED DESCRIPTION OF EXEMPLARY EMBODIMENTS

Figure 1:
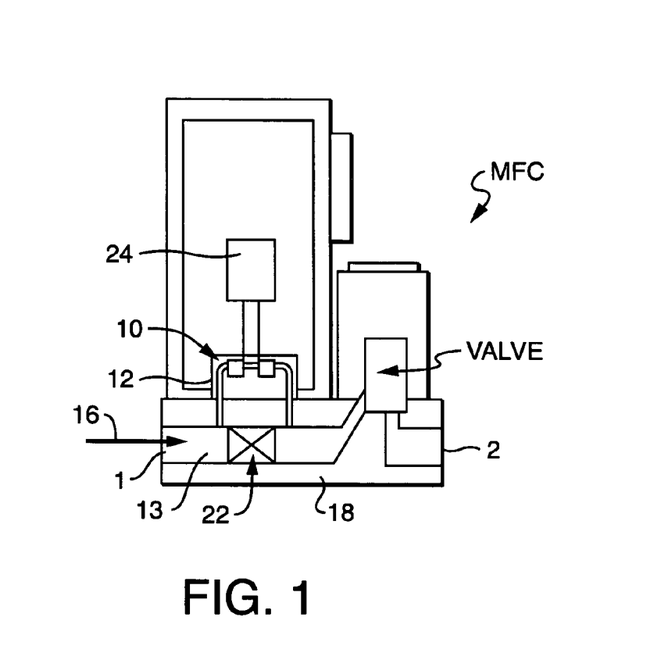
FIG. 1 is a diagram of an exemplary embodiment of a thermal based mass flow controller including a mass flow rate sensor constructed in accordance with the prior art.
Figure 2:
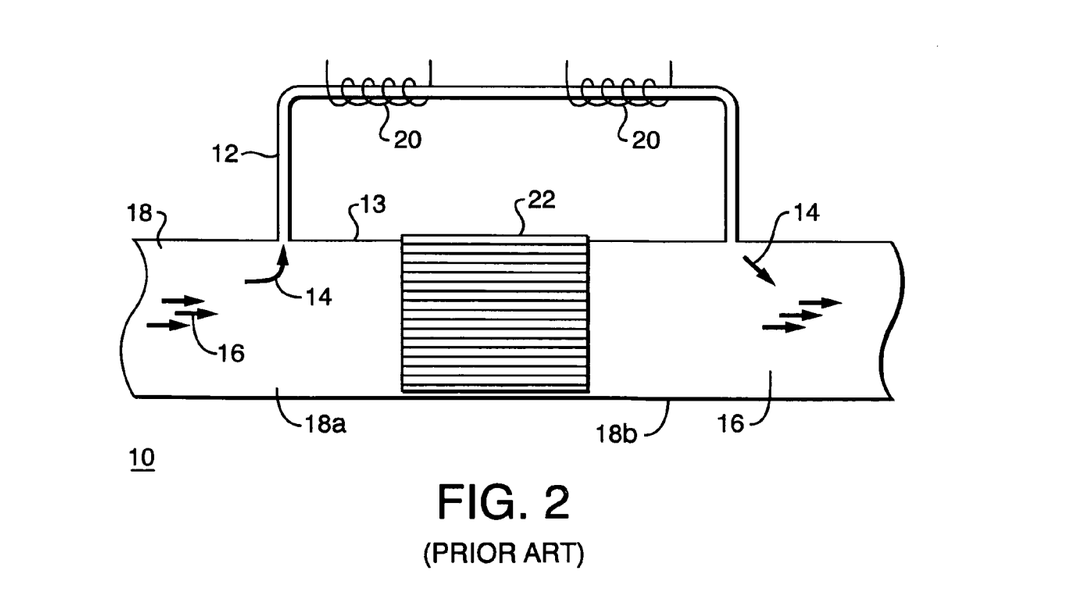
FIG. 2 is an enlarged sectional view of a portion of the flow rate sensor of FIG. 1 showing a main conduit, a sensor tube, a bypass tube, heating elements and a laminar flow element of the flow rate sensor.
Figure 3:
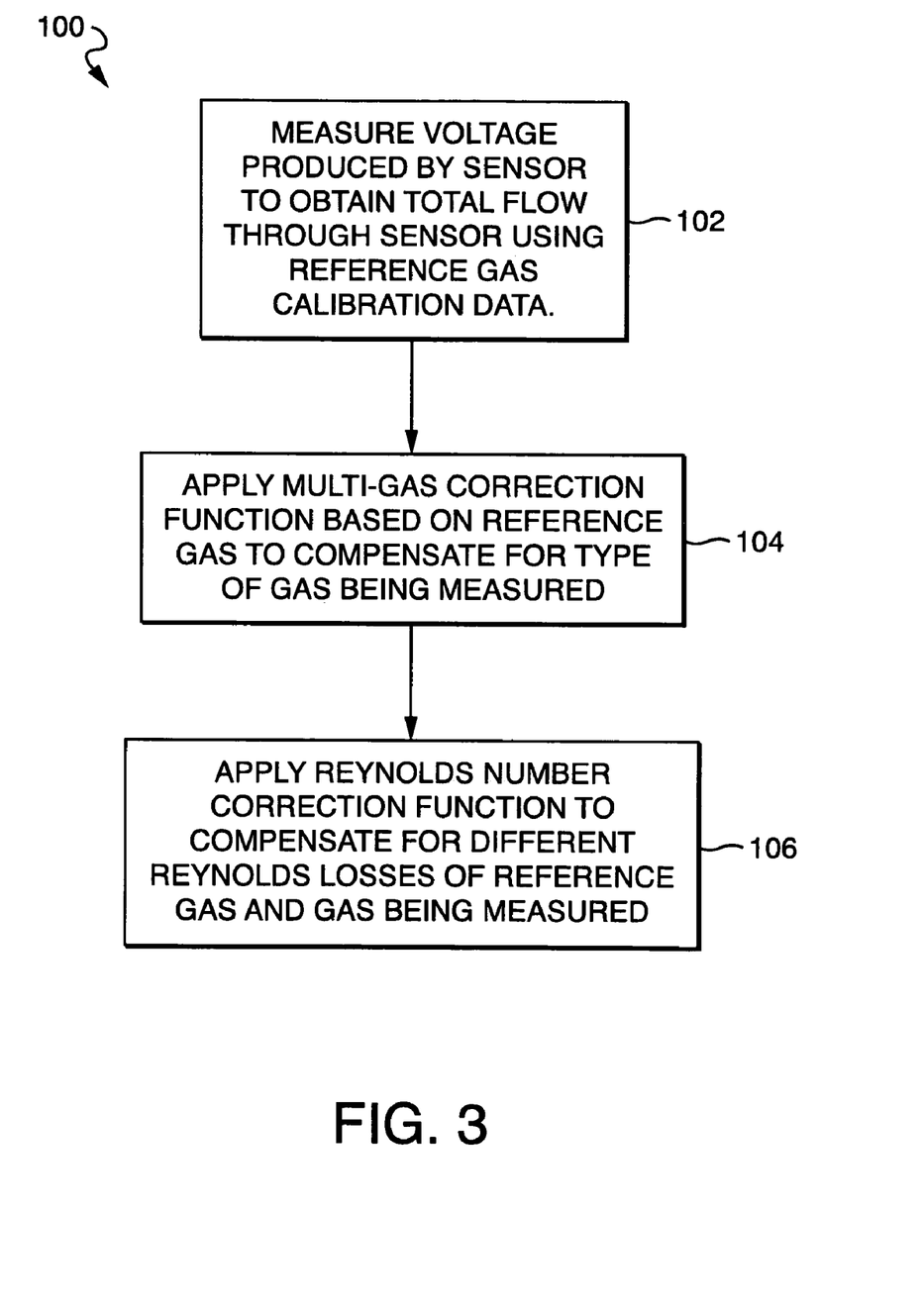
FIG. 3 is a flow chart illustrating an exemplary embodiment of a control algorithm constructed in accordance with the present disclosure for use by a thermal based mass flow controller, such as the prior art thermal based mass flow controller shown in FIGS. 1 and 2.

Referring to the drawings, FIG. 3 shows an exemplary embodiment of a control algorithm 100 provided in accordance with the present disclosure for use by a thermal based mass flow controller (MFC), such as the prior art MFC shown in FIGS. 1 and 2. In such an application, the control algorithm 100 of the present disclosure is programmed into a processor 24 of the MFC. The present disclosure is also directed to a method of measuring flow and a method of controlling flow using the control algorithm 100 of FIG. 3.

Among other features and benefits, the control algorithm 100 of the present disclosure operates the MFC substantially independently of gas properties. In addition, the control algorithm 100 of the present disclosure provides compensation for the Reynolds Losses of different gases.

In FIG. 1 there is shown an example of a typical MFC. The MFC generally includes a main conduit 18 including an upstream portion 18a connected to an inlet 1 of the MFC and a downstream portion 18b connected to an outlet 2 of the MFC. The MFC also includes a mass flow rate sensor 10 for measuring the rate of flow of gas through the MFC, a valve for controlling the flow of gas through the MFC and a computer 24 mounted on a P.C. board and connected to the mass flow rate sensor 10 and the valve. The computer, or processor 24, is programmed with a desired flow rate through a data connector, for example, which the computer compares to an actual flow rate as measured by the mass flow rate sensor 10. If the actual flow rate does not equal the desired flow rate, the processor 24 is further programmed to open or close the valve until the actual flow rate equals the desired flow rate.

Thermal mass flow sensors operate on the principle of conservation of thermal energy, where power equals the mass flow rate of gas multiplied by the specific heat of the gas, the density of the gas and the temperature change of the gas. The rate of mass flow of a gas can be determined if the properties of the gas, the temperature changes of the gas, and the rate of power applied to the gas are known.

The thermal mass flow rate sensor 10 includes a sensor tube 12 and a bypass tube 13 connecting the upstream portion 18a of the main conduit to the downstream portion 18b of the main conduit such that flow 16 through the main conduit 18 is divided through the sensor tube 12 and the bypass tube 13. The sensor 10 employs the sensor tube 12 as the primary sensing mechanism. It is important to note that this figure is not necessarily to scale. Typically the sensor tube 12 is significantly smaller than the primary conduit 18, but is shown somewhat large in FIG. 2 for clarity. A laminar flow element 22 is normally placed in the bypass tube 13 to provide laminar flow in the bypass tube through a predetermine range of flow.

The sensor 10 also includes heating elements 20 attached to the sensor tube 12 to allow a heat transfer from the heating elements 20, through the tube 12 and to the gas flowing therein. The heating elements 20 also serve as resistance temperature sensors that track the local temperature of the wall of the sensor tube 12. The increase in gas temperature between the two elements 20 is a function of the mass flow rate of the gas through the sensor tube 12, the specific heat of the gas, the density of the gas and the power delivered to the gas from the heater elements 20. A circuit converts the difference in resistance (or temperature) of the two elements 20 into a voltage output (power) which is calibrated to known flow rates. Normally, the change in resistance is converted to voltage by a Wheatstone bridge, which is connected to the processor 24. The processor 24 compares the voltage level produced by the Wheatstone bridge to stored reference gas calibration data to determine the flow rate. The reference gas calibration data is normally obtained experimentally, and is then corrected to a different gas using simulated data or a multi-gas correction function.

Since the calibration data changes for gases other than the reference gas, a characterization of the calibration data is required for each type of gas being measured in the thermal based mass flow rate sensor, in order for the resulting measurement to be accurate. This characterization is also referred to as multi-gas correction functions. The multi-gas correction function is the ratio of flows, in the sensor tube only, of the new gas over the reference gas (Qnew/Qref). This ratio changes with sensor voltage. The calibration table of the reference gas is simply a list of sensor voltages and measured total flows at those voltages. To obtain the calibration table in the new gas, the flow of the reference gas is multiplied by the multi-gas correction function at each voltage in the reference gas calibration table.

The multi-gas correction function assumes that the ratio of total flow through the sensor, i.e., flow through the sensor tube and the bypass tube, is equal to the ratio of flow just through the sensor tube. In other words, the multi-gas correction function assumes that a bypass ratio is the same in both the reference gas and the gas being measured. The bypass ratio η (also referred to as split ratio) of the sensor is given by the ratio of the total amount of gas flowing through the bypass tube and the sensor tube divided by the amount of gas flowing through the sensor tube only. However, the bypass ratio changes for different gases because of pressure losses, or entrance effects, caused by non-ideal geometric conditions of the primary conduit, the bypass tube and the sensor tube. These pressure losses are often referred to as "Reynolds Losses" because the losses are a function of the Reynolds number of the gas being measured. The Reynolds Losses are a major source of error in measuring the gas flow.

The control algorithm 100 of the present disclosure provides compensation for the Reynolds Losses of different gases. The Reynolds number compensation utilizes the fact that all bypass errors are a function of Reynolds number, and that the bypass ratio error between different gases can be compensated for using the Reynolds number.

Referring to FIGS. 1–3, an exemplary embodiment of the control algorithm 100 of the present disclosure instructs the processor to measure the voltage produced by the sensor 10 to obtain total flow through the sensor using reference gas calibration data, as shown at 102, and instructs the processor to apply multi-gas correction function based on the reference gas to compensate for the type of gas being measured, as shown at 104. The control algorithm 100 then instructs the processor of the sensor 10 to apply a Reynolds Number correction function to compensate for the different Reynolds Losses of the reference gas and the gas being measured, as shown in 106.

Figure 4:
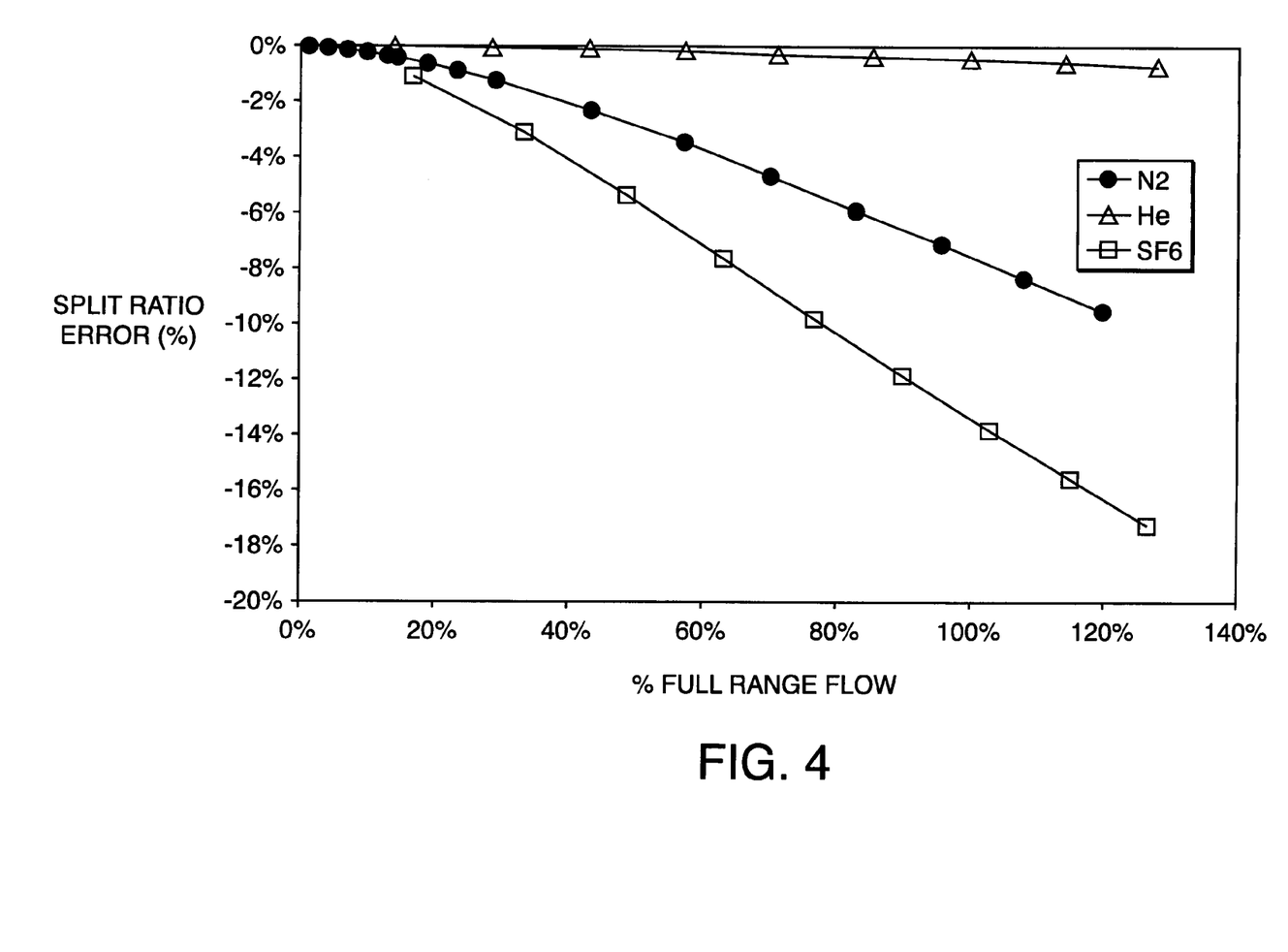
FIG. 4 is a graph illustrating a numerical simulation of changes in bypass ratio for three gases versus flow rate for a thermal based mass flow controller, such as the prior art thermal based mass flow controller shown in FIGS. 1 and 2.

FIG. 4 is a graph of a numerical simulation of changes in bypass ratio for three gases versus flow rate for a thermal based mass flow controller, such as the prior art thermal based mass flow controller shown in FIGS. 1 and 2. This graph illustrates the multi-gas bypass ratio error $\epsilon_{bp}$ of the three gases and shows that the bypass ratio is different for each gas.

Figure 5:
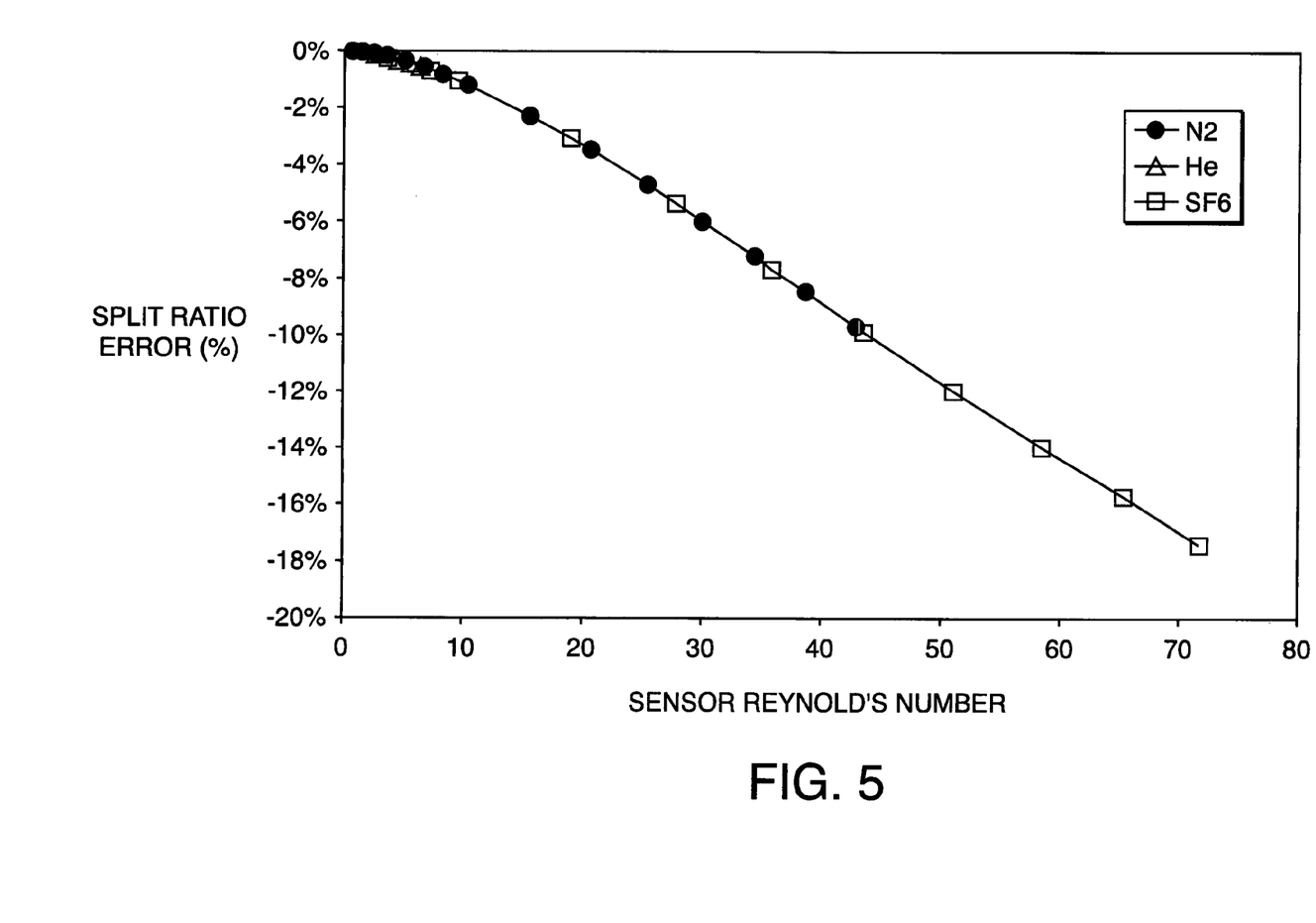
FIG. 5 is a graph illustrating a numerical simulation of changes in bypass ratio for three gases versus Reynolds Number for a thermal based mass flow controller, such as the prior art thermal based mass flow controller shown in FIGS. 1 and 2.

FIG. 5 is a graph of a numerical simulation of changes in bypass ratio for three gases versus Reynolds Number for a thermal based mass flow controller, such as the prior art thermal based mass flow controller shown in FIGS. 1 and 2.

The graph of FIG. 5 illustrates that the bypass geometry has a unique "bypass ratio versus Reynolds Number" curve that is substantially the same for all of the gases. The plotted curve, therefore, can be used to compensate for the Reynolds losses produced by the particular geometries of the sensor tube 12 and the bypass 22. In general, a polynomial function is obtained from this plotted curve, and coefficients are obtained from the polynomial function. This often requires at least two gases so that the data spans across a large domain of Reynolds numbers. Once the coefficients are determined they can be used for any gas.

An example of a Reynolds number correction function of the present disclosure is:

$$Q_X^{n+1} = Q_X^n [(1 + C_1 Re_{Ref} + C_2 Re_{Ref}^2 + C_3 Re_{Ref}^3) \div (1 + C_1 Re_X + C_2 Re_X^2 + C_3 Re_X^3)],$$

Where, $Re_X$ is the Reynolds number for gas X and is equal to $Q_X^n \rho_{stp X} d \div \mu_X$, Q is the total flow, $\rho_{stp}$ is the density of gas X at standard conditions, d is a characteristic diameter of the flow, $\mu$ is the absolute viscosity of gas X, $C_1$, $C_2$ and $C_3$ are the polynomial coefficients of a bypass ratio error curve versus Reynolds Number, such as the graph of FIG. 5, obtained experimentally or simulated numerically, Ref is the reference gas (e.g., nitrogen), X is the gas being measured, and n is the iteration number. The iteration number is usually 3 or 4. The Reynolds number correction function is particularly useful for higher ranges of flow, such as a flow rate of 1000 sccm or more, since it is very difficult to design a bypass at higher flows where the Reynolds losses are small.

The Reynolds number is a dimensionless parameter, $Q\rho L/\mu$ where L is some characteristic length. However, L is just a constant that is arbitrary in this application because it is the same for all gases. For example, FIG. 5 could be plotted against the Reynolds number in the bypass tube 13 instead of in the sensor tube 12, and the curve would look the same, only the numbers on the x-axis would be different. The bypass coefficients would be different by a constant. Another example is the iteration superscripts. The iteration is necessary because the corrected flow is being used to define itself. This can not be solved mathematically unless the uncorrected flow is first placed on the right hand side of the equation, $Q^0$ and solved for the corrected flow on the left hand side, $Q^1$. Then the equation with $Q^1$ on the right hand side is solved to get $Q^2$. This is repeated until the iteration converges ($Q^n = Q_{n+1}$)

Figure 6:
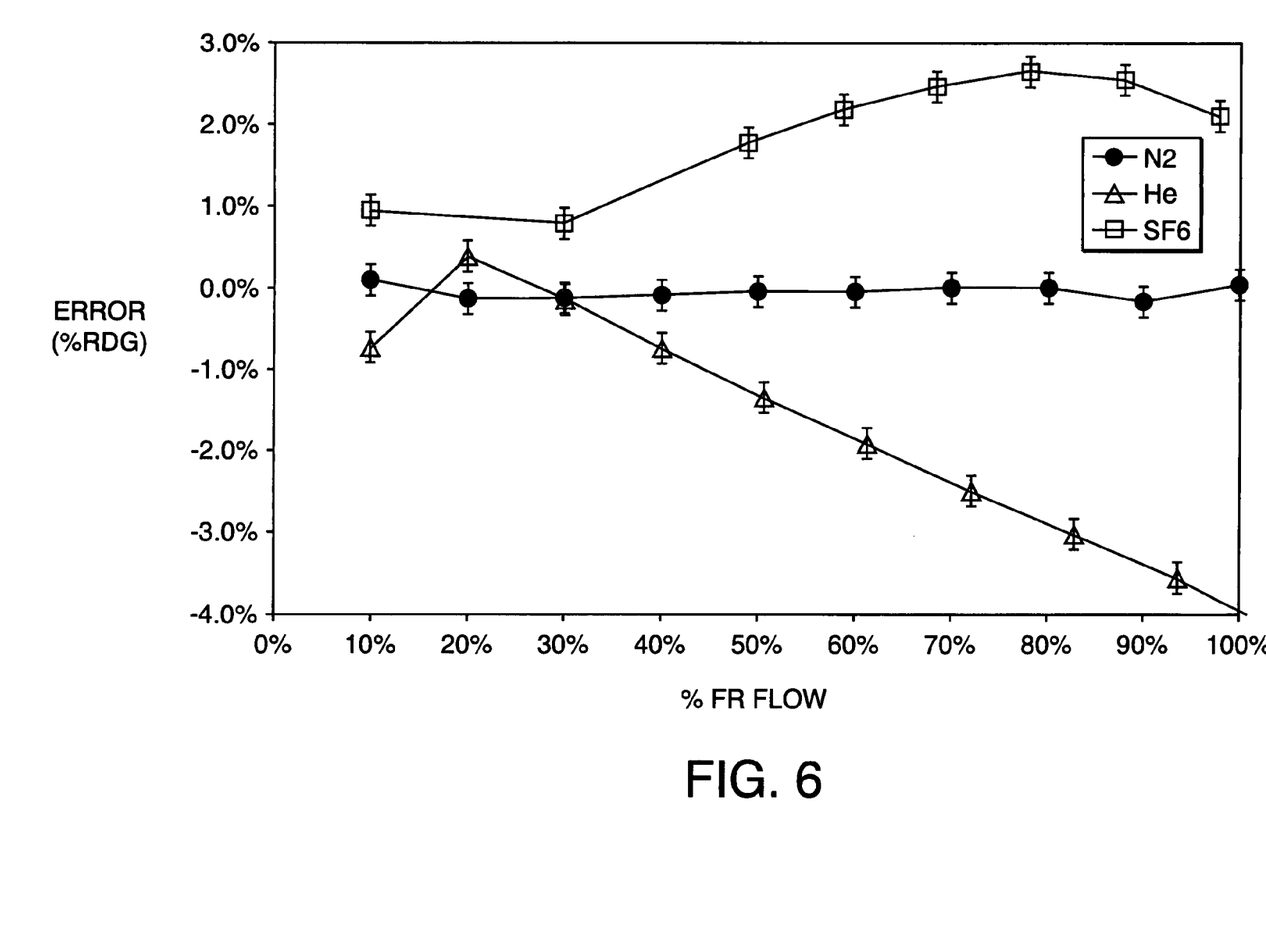
FIG. 6 is a graph illustrating measured bypass ratio errors for three gases versus percent full range flow rate for a thermal based mass flow controller, such as the prior art thermal based mass flow controller shown in FIGS. 1 and 2.
Figure 7:
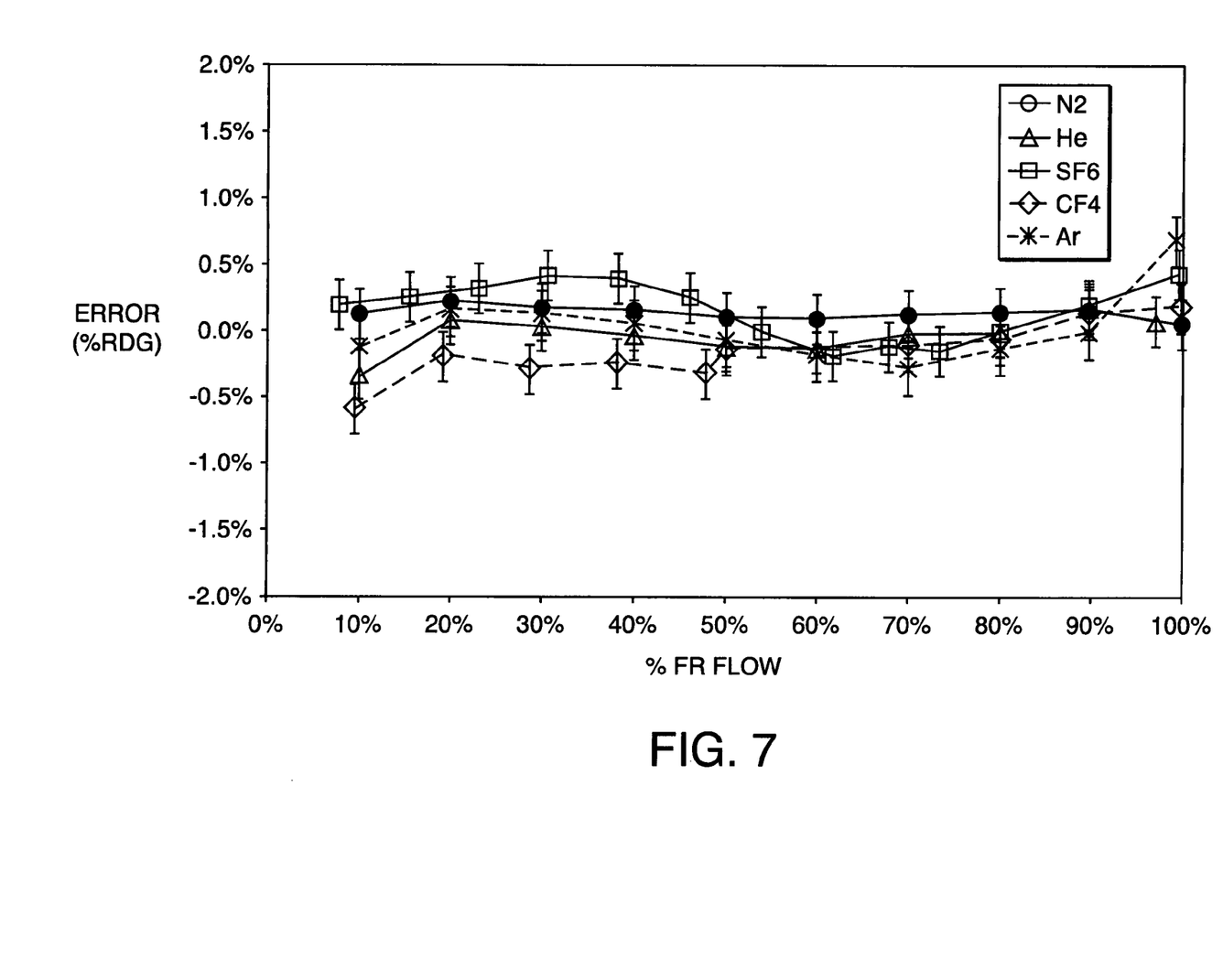
FIG. 7 is a graph illustrating measured bypass ratio errors for five gases versus percent full range flow rate for a thermal based mass flow controller, such as the prior art thermal based mass flow controller shown in FIGS. 1 and 2, utilizing the control algorithm of FIG. 3.

FIG. 6 is a graph illustrating measured flow errors for three gases versus percent full range flow rate for a thermal based mass flow controller, such as the prior art thermal based mass flow controller shown in FIGS. 1 and 2, wherein only the multi-gas correction function is applied but not the Reynolds number correction function. FIG. 7 is a graph illustrating measured flow errors for five gases versus percent full range flow rate for a thermal based mass flow controller, such as the prior art thermal based mass flow controller shown in FIGS. 1 and 2, utilizing the control algorithm of FIG. 3 wherein the multi-gas correction function and the Reynolds number correction function are applied. The graphs in FIGS. 6 and 7 illustrate the improved performance of the mass flow controller utilizing the control algorithm of FIG. 3. In addition, although the Reynolds number correction function is obtained from the data shown in the graph of FIG. 5 based on only three gases, $N_2$, He and $SF_6$, the Reynolds number correction function is applicable to gases other than the three gases $N_2$, He and $SF_6$, such as $CF_4$ and Ar, as illustrated by the graph of FIG. 7. Once the coefficients are determined they can be used any gas.

The present disclosure may be embodied in other specific forms without departing from the spirit or essential characteristics thereof. The exemplary embodiments describe herein are therefore to be considered in respects as illustrative and not restrictive, the scope of the disclosure being indicated by the appended claims rather than by the foregoing description. All changes which come within the meaning and range of the equivalency of the claims are therefore intended to be embraced therein.

What is claimed is:

1. A flow rate sensor, comprising:
a sensor tube and a bypass tube dividing flow through the sensor, wherein a bypass ratio of the sensor equals a total flow rate through the sensor divided by a flow rate through just the sensor tube;
heater elements for heating an upstream portion and a downstream portion of the sensor tube;
a circuit connected to the heater for producing a voltage based upon a difference in resistance between the heater elements, and wherein the voltage is calibrated based on known flow rates of a reference gas through the sensor;
a processor connected to the circuit and programmed to,
measure the flow rate through the sensor based upon the calibrated voltage from the circuit, and
multiply the measured flow rate by a multi-gas correction function and a Reynolds number correction function to compensate for differences between the bypass ratios of the reference gas and the gas being measured.

2. A sensor according to claim 1, wherein the circuit connected to the elements comprises a Wheatstone bridge.

3. A mass flow controller including a flow rate sensor according to claim 1, and further including main conduit connected to the bypass tube and the sensor tube, and a valve for controlling mass flow through the main conduit.

4. A sensor according to claim 1, wherein the Reynolds number correction function is equal to:

$$Q_X^{n+1} = Q_X^n [(1+C_1 Re_{Ref}+C_2 Re_{Ref}^2+C_3 Re_{Ref}^3) \div (1+C_1 Re_X+C_2 Re_X^2+C_3 Re_X^3)],$$

where, $Re_X$=Reynolds number for gas $X = Q_X^n \rho_{stpX} d \div \mu_X$,
Q=Total flow,
$\rho_{stp}$=Density at standard conditions,
d=a characteristic diameter of the flow,
$\mu$=Absolute viscosity,
$C_1$, $C_2$ and $C_3$=Polynomial coefficients of a bypass ratio error curve versus Reynolds Number obtained experimentally or simulated numerically,
Ref=Reference gas (e.g., nitrogen),
X=Gas being measured, and
n=Iteration number.

5. A sensor according to claim 4, wherein the polynomial coefficients of the bypass ratio error curve versus Reynolds Number are obtained experimentally.

6. A sensor according to claim 1, wherein the bypass tube is sized to allow a flow rate of 1000 sccm or more.

7. A method of measuring a rate of a gas flow, comprising:
dividing the flow between a bypass tube and a sensor tube, wherein a bypass ratio equals a total flow rate through the sensor divided by a flow rate through just the sensor tube;
heating an upstream portion and a downstream portion of the sensor tube using heater elements;
measuring a difference in resistance between the heater elements, wherein the resistance is calibrated based on known flow rates of a reference gas;
measuring the flow rate through the sensor tube and the bypass tube based upon the calibrated resistance from the heater elements; and
multiply the measured flow rate by a multi-gas correction function and a Reynolds number correction function to compensate for differences between the bypass ratios of the reference gas and the gas being measured.

8. A method according to claim 7, wherein the Reynolds number correction function is equal to:

$$Q_X^{n+1} = Q_X^n [(1+C_1 Re_{Ref}+C_2 Re_{Ref}^2+C_3 Re_{Ref}^3) \div (1+C_1 Re_X+C_2 Re_X^2+C_3 Re_X^3)],$$

where, $Re_X$=Reynolds number for gas $X = Q_X^n \rho_{stpX} d \div \mu_X$,
Q=Total flow,
$\rho$stp=Density at standard conditions,
d=a characteristic diameter of the flow,
$\mu$=Absolute viscosity,
$C_1$, $C_2$ and $C_3$=Polynomial coefficients of a bypass ratio error curve versus Reynolds Number obtained experimentally or simulated numerically,
Ref=Reference gas (e.g., nitrogen),
X=Gas being measured, and
n=Iteration number.

9. A method according to claim 8, wherein the polynomial coefficients of the bypass ratio error curve versus Reynolds Number are obtained experimentally.

10. A method according to claim 7, wherein the resistance is measured using a Wheatstone bridge to provide a voltage indicative of the flow through the sensor tube.

11. A method according to claim 7, wherein the main conduit is sized to allow a flow rate of 1000 sccm or more.

12. A method for controlling mass flow, comprising:
providing a main conduit having an upstream portion and a downstream portion;
connecting the upstream portion of the main conduit to the downstream portion of the main conduit through a sensor tube and a bypass tube so that flow through the main conduit is divided through the sensor tube and the bypass tube, wherein a bypass ratio equals a total flow rate through the sensor divided by a flow rate through just the sensor tube;
heating an upstream portion and a downstream portion of the sensor tube using heater elements;
measuring a difference in resistance between the heater elements, wherein the resistance is calibrated based on known flow rates of a reference gas;
measuring the flow rate through the main conduit based upon the calibrated resistance from the heater elements;
multiply the measured flow rate by a multi-gas correction function and a Reynolds number correction function to compensate for differences between the bypass ratios of the reference gas and the gas being measured;
controlling mass flow through the main conduit;
receiving a desired flow rate;
comparing the desired flow rate to the Reynolds number-corrected flow rate through the main conduit; and
changing mass flow through the main conduit until the Reynolds number-corrected flow rate through the main conduit equals the desired flow rate through the main conduit.

13. A method according to claim 12, wherein the Reynolds number correction function is equal to:

$$Q_X^{n+1} = Q_X^n [(1+C_1 Re_{Ref}+C_2 Re_{Ref}^2+C_3 Re_{Ref}^3) \div (1+C_1 Re_X+C_2 Re_X^2+C_3 Re_X^3)],$$

where, $Re_X$=Reynolds number for gas $X = Q_X^n \rho_{stpX} d \div \mu_X$,
Q=Total flow,
$\rho_{stp}$=Density at standard conditions, d=a characteristic diameter of the flow,
μ=Absolute viscosity,
$C_1$, $C_2$ and $C_3$=Polynomial coefficients of a bypass ratio error curve obtained experimentally or simulated numerically,
Ref=Reference gas (e.g., nitrogen),
X=Gas being measured, and
n=Iteration number.

14. A method according to claim 13, wherein the polynomial coefficients of the bypass ratio error curve versus Reynolds Number are obtained experimentally.

15. A method according to claim 12, wherein the main conduit is sized to allow a flow rate of 1000 sccm or more.

* * * * *